H. CASSARD.
PROCESS OF REFINING SHELLAC AND ITS ALLIED LACS.
APPLICATION FILED JULY 8, 1912.
1,066,794.
Patented July 8, 1913.
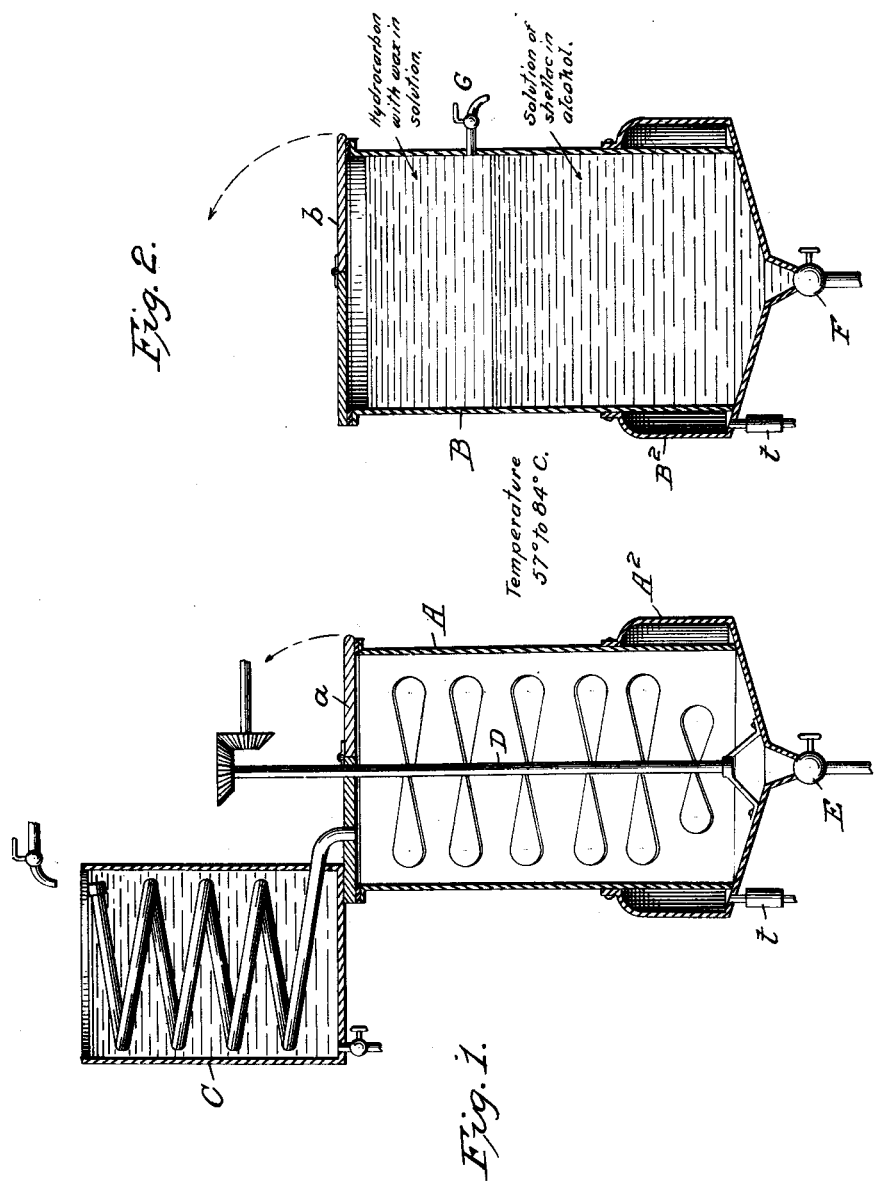
WITNESSES
INVENTOR
Howard Cassard.
By Edw. W. Byrn.
Attorney

UNITED STATES PATENT OFFICE.

HOWARD CASSARD, OF BALTIMORE, MARYLAND.

PROCESS OF REFINING SHELLAC AND ITS ALLIED LACS.

1,066,794.  Specification of Letters Patent.  Patented July 8, 1913.

Application filed July 8, 1912. Serial No. 708,112.

*To all whom it may concern:*

Be it known that I, HOWARD CASSARD, a citizen of the United States, residing at Baltimore city, in the State of Maryland, have invented certain new and useful Improvements in Processes of Refining Shellac and Its Allied Lacs, of which the following is a specification.

My invention relates to a process for the refining of lac, shellac, and allied products, either for the production of varnish, lacquer, or for the manufacture and sale of the gum lac or of shellac as a refined commercial product.

In the refinement of stick lac, seed lac, button lac, ruby lac, shellac, etc., a great difficulty has been encountered, in that these commercial products contain not only the pure lac gum soluble in alcohol, but also a wax and other impurities which are not soluble in alcohol or only partially so, and whose presence prevents a transparent lac solution and also renders the varnish liable under certain conditions to turn gray. It has been sought to eliminate this wax and impurities by a process employing two different solvents, one for the shellac and the other for the wax, the latter being immiscible with or antagonistic to the former. The solvent which was employed for the shellac was alcohol and that for the wax was benzin. As both of these solvents are extremely volatile, this process had to be conducted at the low temperature of from 30° to 35° centigrade, because a lower temperature hindered the separation and a higher one volatized and wasted the solvents. This process was exceedingly slow, as the separation by subsidence of the two cold solutions required from one to two weeks' time. More serious than this, however, is the fact that benzin is itself soluble in the proposed menstruum to the extent of about 11¾% at 60° Fahr. The boiling point of benzin (80° C.) being 1.7° higher than that of ethyl alcohol (78.3° C.) and 15.2° higher than that of methyl alcohol (64.8° C.), the final elimination of the soluble hydrocarbon through the usual method of fractionating is, therefore, impossible.

My process proceeds along the lines of using two solvents, one for the shellac and the other for the wax and other impurities, but it employs, in the place of benzin as the wax solvent, a hydrocarbon having a much higher boiling point, such as kerosene, and employs also as an important and necessary feature a temperature at and above the melting point of the suspended wax. This temperature runs from 57° to 84° centigrade, and the great advantage of my process is that the separation of the alcoholic solution of purified shellac from the hydrocarbon solution of wax is effected in less than a day, instead of from one to two weeks, and a beautiful, clear alcoholic solution of lac is obtained free from all objectionable impurities and possessing great industrial values.

In carrying out my process at the relatively high temperature it is economically desirable to employ a condenser which condenses the vaporized solvents and, after liquefying them, returns them to the tank in which the process is carried out.

An apparatus for carrying out my invention is shown in the accompanying drawings, in which:

Figure 1 is a vertical sectional view of the melter, agitator and condenser, and Fig. 2 is a similar view of the precipitation and settling tank with draw-off cocks.

In the drawings A represents a tank having around its side walls, at the lower end, a jacket $A^2$ for steam. In this tank is arranged a revolving agitator D and in the bottom is an outlet cock E. The tank is hermetically closed at the top, but has a hinged cover $a$ to permit the insertion of the materials.

C is a condenser, of any approved type, consisting of a coil in open communication with the top of the tank and surrounded, within the casing of the condenser, by a flowing body of cold water.

In Fig. 2 a similar tank B is provided with a steam jacket $B^2$, hinged cover $b$, and draw-off cocks F and G. Any desired form of steam trap $t$ is employed in connection with the steam jackets.

In carrying out my process I take equal parts, by weight, of shellac and denatured alcohol which are introduced into the tank A. This tank may be equipped with steam coils at its bottom, but I prefer the steam jacket $A^2$, as it is not fouled by the contents of the tank as the steam coils would be. Heat is then applied to the boiling point, 57° to 58° centigrade. In ten minutes after boiling starts dissolution is complete. Up to this time the agitator is not required, as the ebullition causes rapid dissolution. This temperature is maintained, for if allowed to drop as much as to 55° centigrade the mass solidifies and resembles vaseline, due to the fact that the suspended wax existing as an impurity having been rendered soluble does not recrystallize at this stage, but in combination with the other constituents cools to a homogeneous mass, so I keep the temperature above the melting point of the wax, i. e., up to 57° to 58° centigrade. A quantity of kerosene is now added and the whole mass is now boiled and agitated for 30 minutes, ebullition alone not being sufficient to incorporate the kerosene. The proportion of kerosene employed does not differ substantially from that of the benzin heretofore employed, which was a quantity of the hydrocarbon about equal to the quantity of alcohol employed, and which proportions I do not claim as new. The homogeneously mixed and hot liquid is now drawn off through a suitable strainer at cock E and transferred to the tank B, where the temperature is still maintained by the steam jacket B² above the melting point of the wax. Motion being now suspended, the kerosene gradually rises to the surface with the wax in solution, the greater portion being drawn off at the cock G while still hot, or above the melting point of the wax, or the latter will granulate and precipitate. The wax having been for the greater part removed, the clear alcoholic solution of the shellac may be drawn off through the cock F until the remaining thin upper strata of hydrocarbon appears, whereupon the separation is completed. The maintenance of the temperature above the melting point of the wax is, it will be seen, a very important and essential point. The separation above referred to is practically complete in from three to four hours at 60° to 61° centigrade. Only a trace of kerosene is soluble in the monatomic alcohols, and, as lac repels kerosene and wax is practically insoluble in cold alcohols of this group, the mixture makes a fine, clean separation. It will readily be seen that my proportion of alcohol and shellac would hardly be possible in the cold, as it is a very concentrated solution. At the finish I preferably add another equal volume of alcohol, which is not only economic practice, but the remaining trace of kerosene is cut in half. The fact is its odor is entirely lost, or covered by that of the acetone of the denatured alcohol.

The finished product of purified shellac in alcohol may be marketed in solution as a varnish, or may be distilled to leave as a residuum a fine, glossy gum as a new article of manufacture.

When the alcohol is distilled off a waxless virgin lac results from which, if desired, the lac dye may be by present methods removed the easier, the lac being first powdered.

In carrying out my invention in the example given, I employ kerosene as a solvent of the wax, but I do not confine my invention to kerosene, but may use any of the hydrocarbons which will dissolve wax and the boiling point of which hydrocarbons is higher than 60° centigrade, i. e., above the melting point of the suspended wax.

As to the alcoholic solvent which I employ, I may use either denatured alcohol, methyl alcohol, or ethyl alcohol. When using denatured alcohol or crude methyl alcohol, the temperature which I employ is 57° to 63° centigrade. For refined methyl alcohol the temperature should be 67° to 73° centigrade. For ethyl alcohol the temperature should be 78° to 84° centigrade.

With reference to the use and value of the condenser, it will be seen that with the volatile solvents, and relatively high temperature, there would be in the closed tanks either an undesirable pressure if closed or the loss of alcoholic vapor if open. The condenser prevents both of these contingencies and yet allows me to use a temperature that is sufficiently higher than the melting point of the suspended wax to maintain its fluidity, mobility, and conditions necessary for its separation in stratified layers.

In the example given, the product is designed as a varnish for wood finishing. For confectioners' lacquer for coating burnt almonds and the like, a product absolutely free from suggestion of kerosene is required. In such case I use grain alcohol and, as a hydrocarbon for the solution of the wax, a tasteless and colorless paraffin oil known as Alboleñe, or even the lighter gravities of paraffin wax may be used with good results, as the waxes amalgamate, rise to the surface and may be either drawn off while still hot, or allowed to cool and be removed as a solid cake. It will be understood that the hydrocarbon solvents of the wax may be recovered for use again by any of the known processes.

Instead of heating the alcohol after admixture with the shellac, the alcohol may be heated first.

Ordinarily the crude lac is ground before admixture with the alcohol, but in stick lac, and seed lac, the grinding is preferably omitted, on account of the presence of twigs and foreign bodies easily removed by straining, but which would be comminuted by such grinding process to the embarrassment of the subsequent separation.

It will be seen that the alcoholic solutions which I employ are very concentrated and they may, if desired, be reduced by acetone or appropriate solvents other than monatomic alcohols.

Although preferring to effect the separation of the two solutions by subsidence in stratified layers in tank B, the separation may be accelerated by centrifugal separators, the leading features of my invention being the employment of the two different characters of solvents at a temperature above the melting point of the suspended wax, and also the economic employment of a condenser to take care of the volatilized solvents at the relatively high temperatures which I employ; and also, further, the fundamental step of dissolving the lac with alcohol at a temperature above the melting point of the suspended wax impurities, i. e., above 57° centigrade, whether the hydrocarbon solvent of the wax be employed or some other method of separating the wax be employed. In refining lac it is of great importance that the same be processed in concentrated solution. With alcohol and heat above the melting point of the wax, the degree of concentration is practically unlimited.

I claim:

1. In a process for refining shellac and its allied lacs, the step which consists in subjecting the same to the dissolving action of two solvents, an alcoholic solvent for the lac, and a hydrocarbon solvent for the wax, at a temperature above the melting point of the wax, i. e., from 57° to 84° centigrade.

2. In a process for refining shellac and its allied lacs, the combined steps which consist in subjecting the same to the dissolving action of two solvents, an alcoholic solvent for the lac, and a hydrocarbon solvent for the wax, at a temperature above the melting point of the wax, i. e., from 57° to 84° centigrade, and then, while maintained at such temperatures, separating the two solutions by subsidence in stratified layers and drawing off the layers.

3. In a process for refining shellac and its allied lacs, the combined steps which consist in first subjecting the same to the dissolving action of alcohol, then adding to the solution a hydrocarbon solvent for the wax, mixing the two solutions homogeneously by agitation at a temperature above the melting point of the wax, then drawing off the heterogeneous mixture, maintaining the temperature and separating the two solutions.

4. In a process for refining shellac and its allied lacs, the combined steps which consist in subjecting the same to the dissolving action of two solvents, an alcoholic solvent for the lac, and a hydrocarbon solvent for the wax, at a temperature above the melting point of the wax, i. e., from 57° to 84° centigrade, drawing off and liquefying the evaporated vapors and returning them to the mass being heated to relieve pressure and save the vapors, and then, while sill maintaining such temperature, separating the two solutions by subsidence in stratified layers, then drawing off the two solutions.

5. In the process for refining shellac and its allied lacs, the step of dissolving the shellac with alcohol at a temperature above the melting point of the wax impurities.

In testimony whereof I affix my signature in presence of two witnesses.

HOWARD CASSARD.

Witnesses:
J. R. KNOWLES,
STUART KEARNEY.